United States Patent [19]
Oestreich et al.

[11] Patent Number: 4,814,116
[45] Date of Patent: Mar. 21, 1989

[54] METHOD FOR PRODUCING DEFINED LIGHT WAVEGUIDE LENGTHS IN AN OPTICAL FIBER CABLE

[75] Inventors: Ulrich Oestreich; Gernot Schoeber, both of Munich; Norbert Sutor, Deisenhofen, all of Fed. Rep. of Germany

[73] Assignee: Siemens Aktiengesellschaft, Berlin and Munich, Fed. Rep. of Germany

[21] Appl. No.: 145,986

[22] Filed: Jan. 20, 1988

[30] Foreign Application Priority Data

Jan. 23, 1987 [DE] Fed. Rep. of Germany ....... 3701990

[51] Int. Cl.$^4$ .................. G02B 6/44; B29C 47/02
[52] U.S. Cl. .................... 264/1.5; 264/40.7; 264/173; 264/174
[58] Field of Search .......... 264/1.5, 40.7, 173, 264/174

[56] References Cited

U.S. PATENT DOCUMENTS 4,585,406  4/1986  Ravela ........................... 264/1.5
4,728,470  3/1988  Einsle et al. ................... 264/1.5
4,772,435  9/1988  Schlaeppi et al. ............... 264/1.5

FOREIGN PATENT DOCUMENTS 0193940  9/1986  European Pat. Off. .

Primary Examiner—James Lowe
Attorney, Agent, or Firm—Hill, Van Santen, Steadman & Simpson

[57] ABSTRACT

A method for manufacturing optical fiber cable in which at least one light waveguide, either alone or as a bundle forming a core, is loosely inserted into an outer sheath with a definite length allocation between the length of the core and sheath characterized by passing the cable around a deflection roller and varying the diameter of the deflection roller to obtain the desired length allocation between the sheath and core.

16 Claims, 2 Drawing Sheets

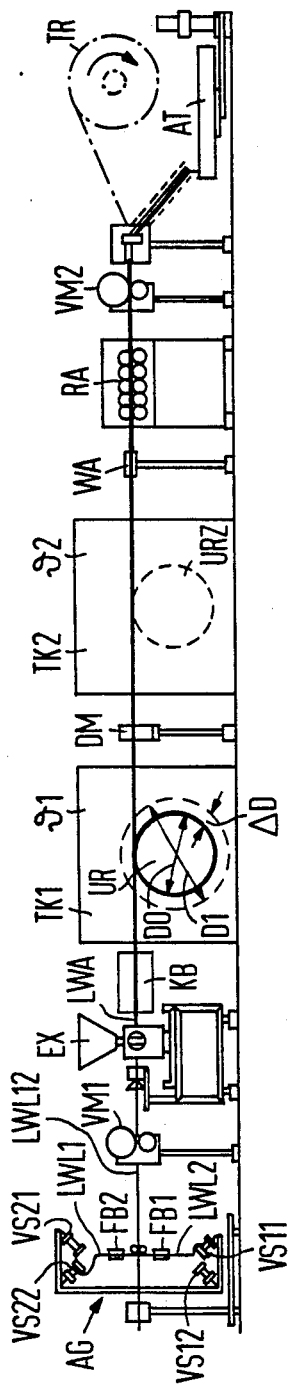
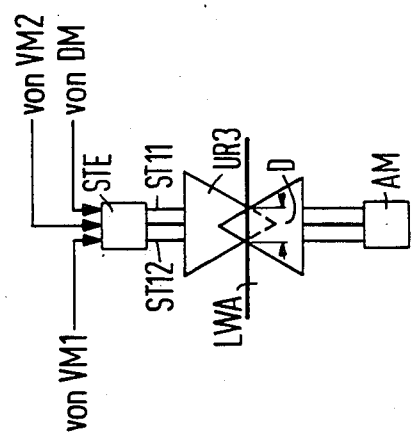
FIG 5
FIG 6

METHOD FOR PRODUCING DEFINED LIGHT WAVEGUIDE LENGTHS IN AN OPTICAL FIBER CABLE

BACKGROUND OF THE INVENTION

The present invention is directed to a method for producing an optical fiber cable whose sheath is drawn from an extruder with an adjustable haul-off rate to loosely contain a core of at least one of the light waveguide so that by guidance of the optical fiber cable around at least one deflection roller following the extruder, the core forms a definite one-sided seating surface together with the inside wall of the sheath in order to obtain a defined shrinkage of the sheath during subsequent cooling.

A method of this type is disclosed by European published patent application No. 01 93 940, which claims priority from the same German application as allowed U.S. patent application Ser. No. 834,768, filed Feb. 28, 1986, which issued on Mar. 1, 1988, as U.S. Pat. No. 4,728,470. and whose disclosure is incorporated by reference. In this allowed application, a certain light waveguide length is set by adequate coupling of the light waveguide to the sheath and the coupling between the light waveguide sheath is thereby achieved throughout by looping the cable over a roller or disc with a large radius and the loop is about 180° and optimally at least 360°. The light waveguide is then uncoupled from the influences of the transmission side and its length is defined by revolutions around the wheel or by running onto dishes. When the sheath at this location has temperature deviating from a standardized, ambient temperature, a length modification of the sheath will occur and, as a result thereof, a definite overlength or under-length (given over-cooling of the sheath) is achieved by subsequent temperature equalization. The negative deviation of the light waveguide from the sheath length on a large radius is either left out of the consideration or is considered to be a side-effect.

The method initially described, however, suffers from a series of disadvantageous incidental influences which can considerably influence the final results. Thus, for example, the fiber braking tension, which is supposed to hold the light waveguide taut up to the take-up dish can be reduced by unavoidable, preceding deflections and can even be rendered ineffective under certain conditions. These deflections then determine the decoupling of the fiber braking tension and, thus, the final light waveguide lengths due to the temperature effective there. In addition, negative length deviations of the light waveguide varies when the length-defining quantity is the variable seating diameter of the dish. In addition, a sheath haul-off force is required due to the injection or extrusion method which is used for manufacturing of the loose sheath, and this sheath haul-off force is maintained until haul-off and stretching of the sheath in an elastic-plastic fashion has occurred. The force disappears following the haul-off, the sheath subsequently will shorten. Excess lengths which are dependent not only on the temperature differences, but also on the haul-off rate and on the extrusion temperatures can thus occur. In addition, the filling compound introduced at the extruder by means of a special method has a highly temperature-dependent minimum shearing strain and exceeding this is what makes a sliding of the light waveguide in the compound possible. This shearing strain must be exceeded by the light waveguide braking force in every case. When, even given a stretched light waveguide, the length-defining radius, for example of the dish, is too far from the extruder, the braking force may potentially no longer suffice for pulling the light waveguide taut up to the length-defining element. This situation can hardly be completely controlled.

It is expedient that the length definition or determination be, in fact, undertaken at a suitable equilibrium temperature, and as close as possible to the extruder. In addition, the length definition should not occur on a dish having a varying coiling diameter. When deflection occurs, they must either lead to a reliable coupling of the light waveguide to the optical fiber cable or must be suppressed. Deflections having an unclear cling factor are to be avoided, at least preceding the location of the length definition of the light waveguides. Substantial temperature variations ae also to be avoided, at least in the region of the length-defining element. Finally, an unavoidable elastic-plastic sheath shortening of the light waveguide must be compensated or over-compensated so that every desired over-length or under-length of the light waveguide and the optical fiber cable sheath can be basically set for every speed and every light waveguide dimension. This compensation should be adjusted and, as experience has shown, should be adapted to the speed utilized in the process.

SUMMARY OF THE INVENTION

The object of the present invention is to avoid the above-noted disadvantages and to modify the optical fiber cable so that the light waveguide exhibits an optimum exact length allocation with respect to the sheath, regardless of the extrusion rate and/or the type of optical fiber cable.

These objects are obtained in an improved method for manufacturing an optical fiber cable having a core of at least one light waveguide element loosely received in a sheath, said method including extruding the sheath loosely around the core to produce the optical fiber cable, hauling-off the cable and at least guiding it loosely around at least one deflection roller subsequent to the extruding to form a defined one-side seat of the core with an inside wall of the sheath in order to obtain a defined shrinkage of the sheath given subsequent cooling of the cable. The improvements are that the guidance of the optical fiber cable are onto at least one deflection roller including varying the diameter of the deflection roller to obtain the desired length change between the sheath and the core of the light waveguide elements.

Such a variable diameter or interchangeable deflection roller offers the possibility of achieving every desirable length allocation of the light waveguide relative to the sheath of the optical cable, for example, taking the extrusion rate and the optical fiber cable diameter into consideration. Since the diameter of the deflection roller is the only thing that needs to be varied, the desired adaptation can be achieved at any time with little outlay and relatively fast and reliably without involved retooling operations being required. One can, thereby, even proceed so that the diameter modification occurs steadily insofar as corresponding parameters are to change steadily. In most cases, however, it will be adequate to select a diameter of the deflection roller mating, for example, with a defined diameter of the sheath and with a defined haul-off rate and to permanently set this diameter.

It is provided, in accordance with an especially advantageous embodiment of the present invention, to vary the diameter of the deflection roller dependent on the haul-off rate. This haul-off rate is that quantity which influences the length allocation to an especially great degree. One thereby advantageously proceeds in such detail that the diameter of the deflection roller is diminished, given an increase of the haul-off rate v.

A reduction of the cooling time t is connected with an increase of the haul-off rate v according to $t=1/v$, wherein $l=$the cooling length preceding to the first store. The temperature difference between the actual temperature value and the rated temperature value amounts to $\Delta\theta = \Delta\theta . e - (t/T)$, wherein $T=$a time constant of the cooling process.

The cooling time t should amount to at least 5T. When 5T is set and $5T=L/v_{max}$, wherein $v_{max}$ is the allowable value of v, then $$\Delta v = \Delta v \cdot e^{-\frac{5 \cdot v_{max}}{v}}$$

will occur. For $v > v_{max}$, the temperature distance to be compensated will lead to a sheath length difference of $$\frac{\Delta l_1}{l_1} = \Delta v \cdot \alpha$$

wherein $\alpha$ is an effective coefficient of expansion. On the other hand the loss in fiber length is $$-\frac{\Delta L_2}{L_2} = \frac{d}{D}$$

wherein d is the free inside lead diameter and D is the effective diameter D of the deflecting roller. Then, $$\Delta v \cdot \alpha = -\frac{d \cdot \Delta D}{D^2} \text{ and } -\Delta D = \frac{\Delta v \cdot \alpha}{d} \cdot D^2.$$

It is provided in another advantageous improvement of the invention to vary the diameter D of the deflection rollers dependent on the diameter d of the optical fiber cable. With increasing inside cable diameters, the diameter D of the deflection roller is thereby expediently enlarged. The following conformity can be recited as conformity for the increase in the diameter of the optical fiber cable d relative to the diameter D of the deflection roller:

$$\epsilon - - = -\frac{\Delta l}{l} = \frac{d}{D} = \text{constant}$$

$$\left(-\frac{\partial \epsilon}{\partial d} = \frac{1}{D},\right.$$

$$\left. -\partial \epsilon = \frac{1}{D} \cdot \partial d - \frac{\partial \epsilon}{\epsilon} = \frac{D}{d \cdot D} \cdot \partial d = \frac{\partial d}{d}\right)$$

$$d = \epsilon_{-const.} \cdot D, D = \frac{d}{\epsilon_{-const.}}$$

It is expedient to hold the deflection rollers at a constant, preferably elevated, temperature. Values between 20° and 120° C. are expedient as elevated temperature values for the environment of the deflection roller. It is also expedient to arrange the deflection roller in the proximity of the extruder insofar as possible when the desired stabilizing temperature is high enough.

It can also be expedient to drive the deflection roller with a defined moment or torque-controlled drive because the light waveguide cable sheath can already largely relax long before passing the haul-off. A measurement of the length allocation of the light waveguide to the sheath following the haul-off is thereby less falsified. A precise speed measurement there, for example, at the deflection roller proceding and following the final temperature tank, then provides relatively precise information in a simple way regarding whether the desired light waveguide length has, in fact, been set. It is expedient to measure the length of the cable sheath and the following final shrinkage in the relaxed condition upon incorporation of the length loss of the deflection roller.

The invention is also directed to an apparatus for the implementation of the method and this is characterized in that the variable diameter deflection roller is provided following the extruder.

Other advantages and features of the invention will be readily apparent from the following description of the preferred embodiments, the drawings and claims.

BRIEF DESCRIPTION OF THE DRAWINGS

FIG. 5 is a schematic illustration of an apparatus for implementing the method in accordance with the present invention; and FIG. 6 is a schematic plan view for an adjustable deflection roller utilized in FIG. 5.

DESCRIPTION OF THE PREFERRED EMBODIMENTS

The principles of the present invention are particularly useful when incorporated in the apparatus illustrated in FIG. 5 for preforming the method.

Figure 1:
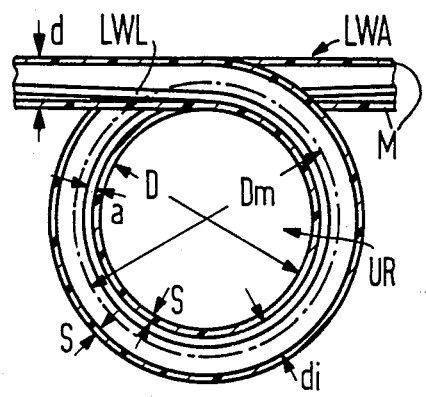
FIG. 1 is a cross sectional view of the optical fiber cable being looped around a deflection roller in accordance with the present invention.

The influence of the diameter D of a deflection roller on a difference in the length or mislength $\epsilon_-$ of the light waveguide LWL is dependent on the diameter d of the optical fiber cable LWA and is best illustrated in FIG. 1. When an optical fiber cable LWA, which has an inside diameter di that is larger than a diameter a of a light waveguide core which is a single fiber or group of light waveguides and the cable is looped around a deflection roller UR, the light waveguide or core LWL places itself against an inside wall of a sheath M, which is closest to the axis of the roller. The wall thickness s of the sheath M, as well as the mean running diameter Dm of the optical fiber cable are also indicated in FIG. 1 for the following calculations of the mislength $\epsilon_-$ thereby occurring. According to FIG. 1, the mislength occurring at the deflection roller UR can be calculated as follows:

$$\epsilon_- = \frac{Dm - (D + 2s + a)}{Dm} = \frac{d - 2s - a}{D + d};$$

with a transformation of Dm=D+d. It must thereby be noted that the bending deformation of the optical fiber cable sheath must be M<3% in order to make plastic deformations which would not falsify the end results. Likewise, the friction between the outside surface of the optical fiber cable sheath M and the deflection roller UR dare not be of such a size that the actual length of the optical fiber cable sheath M is influenced by this frictional force.

When the mislength $\epsilon_-$ is to be independent of the diameter d of the optical fiber cable LWA under defined operating conditions, the diameter D of the deflection roller UR is obtained by transformation as $$D = \frac{d - 2s - a}{\epsilon_-} - d$$

or, since $2s \approx 0.4d$ always applies $$D = \frac{0.6 d - a}{\epsilon_-} - d.$$

when $a \approx 0.1d$ is established, then $$D \approx \frac{0.5 d}{\epsilon_-} - d \text{ or } \epsilon_- \approx \frac{0.5 d}{D + d}.$$

further applies.

When, for example, in an extreme case, $\epsilon_- = 10^{-2}$ is established, the diameter D of the deflection roller UR for the optical fiber cable LWA will have d=2 mm so that $D \approx 10^2 - 2 = 98 \approx 100$ mm, with which the bending expansion remains at about 2%. Likewise valid is d=3 mm and $D \approx 150$ mm, etc.

When it is assumed that the elastic shortening following the haul-off is negligible, the over-length $\epsilon_+$ needed for compensation of the under-length or mislength $\epsilon_-$ is achieved by an excess temperature of the sheath M at the length-defining deflection roller UR: according to $$\Delta v = \frac{\epsilon_+}{\alpha}$$

whereby expansion coefficient $\alpha$ is to be considered as a constant. The resulting overlength, $\Delta \epsilon = \epsilon_+ - \epsilon_-$ will generally be $\geq 0$, with the mislength $\epsilon$, as calculated above, resulting in an over-length of $$\Delta \epsilon = \Delta v \cdot \alpha - \frac{0.5 d}{D + d}$$

waveguide LWL in the optical fiber cable LWA, is ultimately obtained.

One will generally work with $D/d \approx 100$, and this leads to $\epsilon_- \approx 0.5\%$ and $\Delta \theta \approx 60K$, a value that can still be achieved with water, which is very desirable because of the good heat transmission.

The setting of the light waveguides under-length systematically adapted to the diameter d of the optical fiber cable and a stabilized temperature of, for example, 60°–180° C. in the region of the deflection roller then makes it possible for the first time to reliably set every desirable light waveguide over-length or under-length $\Delta \epsilon$. When there is a continuous measurement of the ratio of the light waveguide length to the sheath length, it becomes meaningful to be able to correct the ratio to a rated or desired value, i.e., to make the diameter D of the deflection roller UR or the temperature difference continuously variable. The looping angle of the deflection roller UR should be selected adequately large, preferably between 270° and 360°.

Figure 2:
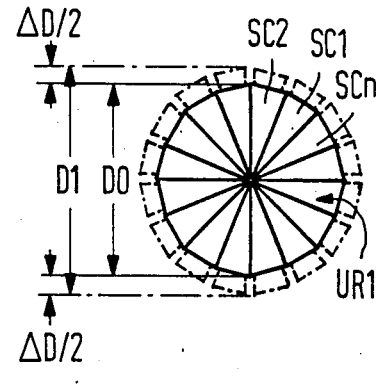
FIG. 2 is a diagramatic end view of a deflection roller composed of a plurality of pie-shaped elements.

A first embodiment of a variable diameter deflection roller is generally indicated at UR1 in FIG. 2. In this embodiment, the deflection roller UR1 is composed of a plurality of individual pie-shaped sectors or poylgons SC1–SCn and can be displaced radially from the position illustrated in bold lines of the smallest possible diameter of D0 up to an enlarged diameter D1, which are indicated in broken lines. The diameter D of the deflection roller UR1 can be set initially by amount $\Delta D$ in accordance with the operating condition. The actual movement of the roller segments or sectors between the various positions are by guide elements which are adjacent the shaft of the roller and which are not illustrated in the drawing.

Figure 3:
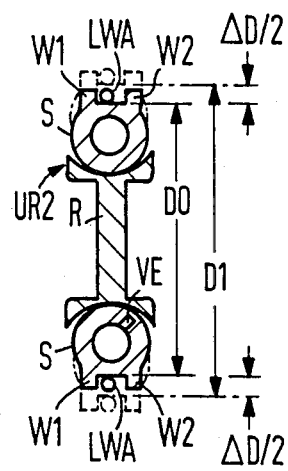
FIG. 3 is a transverse cross sectional view of an embodiment of the deflection roller utilizing an inflatable tire.

A second embodiment of a variable diameter deflection roller, generally indicated as UR2 in FIG. 3. An angular tire or hose S is placed on an appropriately shaped rim of a wheel R, and can have its diameter increased or, respectively, reduced by changing air pressure in the tire or tube via a valve VE. The diameter D0 of the deflection roller UR2 can then be continuously adjusted up to a value D1, which is shown in broken lines, so that a variation of the diameter of the deflection roller UR2 by the amount of $\Delta D$ can be achieved. In order to be able to unproblematically conduct the optical fiber cable LWA over the deflection roller UR2, an outside surface of the hose or tire S is provided with two annular ribs or beads W1 and W2.

Figure 4:
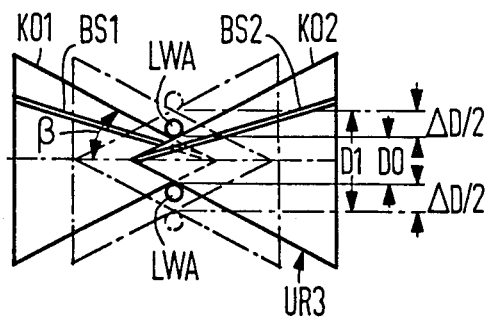
FIG. 4 is another embodiment of the deflection roller composed of inner-fitting, conical half members.

An especially simple embodiment of a variable diameter deflection roller is generally indicated at UR3 in FIG. 4. The diameter D0 occurs at an overlap location which can be enlarged infinitely variable to the value D1 by displacing the two cones KO1 and KO1, which engage into one another, as indicated by the broken-line illustration. The diameter of the deflection roller UR3 can, thus, be varied by the amount $\Delta D$ at the overlap location of the two cones KO1 and KO2. The cone angles $\beta$ of the two cones KO1 and KO2 should be greater than 45° so that the intersection angle should be equal to or greater than 90° so that the sheath M of the optical fiber cable LWA does not get jammed. This deflection roller UR3 is easily seated and is preferably provided with suitable auxiliary drives. The cones KO1 and KO2 are composed of conical sheet metal segments which extend radially from the axis of each of the cones and are arranged so that the segments of one cone extend between the segments of the other cones. The outer edges of each of the triangular or conical-shaped metal sheet segments create a conical surface. In FIG. 4, two of these sheath segments BS1 and BS2 are shown. The change in diameter is, thus, possible in a simple way by axial displacement of the two cones KO1 and KO2.

A horizontal production line for practicing the invention and the apparatus of the present invention is illustrated in FIG. 5 and has a pay-out stand, generally indicated at AG, at which supply reels VS11, VS12, VS21 and VS22 are secured. The light waveguides LWL1, LWL2 are paid out through a fiber brake FB1 and FB2, respectively, and are then combined in a known way to form a group or bundle as a core LWL12. This pay-out involves appropriate rollers, as illustrated. Instead of such a group of light waveguides, a core of a single light waveguide can also be processed in the device illustrated in FIG. 5. The fibers can be partially Z-stranded with one another utilizing a pipe store, if desired.

The single light waveguide fiber or the waveguide group of the core LWL12 proceeds through a first measuring means VM1 to an extruder EX, wherein a sheath M is formed of a plastic material and is loosely applied to the entering light waveguide core LWL12. In addition, it should be noted that a filling compound can be inserted between the sheath and the core adjacent to this extruder. After adequate pre-cooling, for example, with a cooling basin KB, which follows the extruder EX, the cable LWA provided with the sheath M enters into a first tempering chamber or tank TK1, which is kept at a defined temperature $\theta 1$. At least one variable diameter deflection roller UR is positioned in this tempering chamber TK1 and this deflection roller is thereby looped by the optical fiber cable LWA and is driven with set movement by a drive motor AM, as illustrated in FIG. 6. The amount of drive on the deflection roller AM is set so that there is a compensation for frictional movement between the cable and wheel or roller. The speed measurements can occur at the deflection wheel of the first chamber TK1 and of a second chamber TK2. Given variations of the diameter of the wheel or roller UR of the first chamber TK1, the speed is identified in the second chamber TK2.

The diameter D of the deflection roller UR can be continuously varied between the values D0 and D1, which are indicated in broken lines in FIG. 5, dependent on the outside diameter d of the optical fiber cable LWA and dependent on the haul-off rate. The range $\Delta D$ of the variation in diameter which thereby occurs covers all standard operating conditions so that any required over-length or under-length of the light waveguide core LWL12 at the light waveguide sheath can basically be set. When, for example, the increased haul-off speed is used, then the diameter D of the deflection roller UR is diminished or reduced in order to retain the desired length allocation of the light waveguide core LWL12 to the sheath M.

However, it is also possible to conduct the optical fiber cable LWA in the tempering chamber TK1 via more than one variable diameter deflection rollers, such as the deflection roller UR3 of FIGS. 4 and 6. The optical fiber cable LWA should, thereby be guided so that the looping angle is more than 180°. Given employment of two deflection rollers UR, these can be looped by an optical fiber cable LWA in, for example, the form of a figure eight. A thickness measuring means DM is provided at the output of the tempering chamber TK1 before the optical fiber lead LWA enters into a second tempering chamber TK2, which has a temperature of $\theta 2$. It is assumed in the present example that the second tempering chamber TK2 is traversed by the optical fiber cable LWA on a straight line. However, it is also possible to use one or more deflection rollers in the second chamber TK2, and these are expediently working without diameter variation so that only one deflection roller URZ is indicated in broken lines in the second chamber TK2. These deflection rollers can also be utilized for exact speed measurement. When a liquid cooling, for example, water is provided in the region of the tempering chambers TK1 or TK2, an appropriate extraction device can be provided on the outlet. In the present exemplary embodiment, such an arrangement is attached in the output of the chamber TK2 and is a wiping device WA. The cooled optical fiber cable LWA proceeds to a pulling device RA, which is of a caterpillar pull-off type and then proceeds via a second speed measuring device VM2 and then proceeds in a straight line to a plate coiler AT. The cooled optical fiber cable LWA can also be wound onto a cable drum TR, which is shown in broken lines in FIG. 2 instead of being coiled on the plate coiler AT.

A control means STE (see FIG. 6) is provided at the deflection roller UR3, and this control means STE appropriately adjusts the diameter D of the deflection roller UR3 via, for example, thrust rods ST11 and ST12. In order to calculate the required manipulated variable, the needed measurement data is supplied to the controller circuit ST3, namely the speed of the light waveguide core LWL12, which is obtained from the speed measuring means VM1. The speed of the optical fiber cable LWA, which is obtained from the speed measuring means VM2 or from the speed of the deflection roller themselves, and the diameter value d of the optical fiber cable LWA, which is obtained from the measuring means DM. The evaluation of this data expediently occurs in a microprocessor, which is provided in the control means STE.

As a result of the ongoing measurement of the light waveguide length (from the speed measuring means VM1) and of the optical fiber cable length (from the speed measuring means VM2), the mislength $\Delta\epsilon$ of the light waveguide core LWL12 momentarily occurring can be measured during the operation. Given deviations from a desired value, the mislength $\Delta\epsilon$ can be corrected to the desired value by adjusting the diameter D of the deflection roller UR.

For cooling purposes, the chambers TK1 and TK2 can be filled as high as possible with a cooling liquid, which is advantageously water, and which is correspondingly temperature controlled. A temperature $\theta_1$ of 60°–180° C. proves advantageous for the tempering chamber TK1. The value of about 60° C. should be aimed at for the tempering difference of between the two chambers TK1 and TK2. This value can still be achieved without difficulty on the basis of water cooling.

The method of the invention thus offers a possibility of exactly setting and maintaining a prescribed length allocation of the light waveguide core LWL12 to the optical fiber cable LWA by continuous adjustment of the diameter D of the deflection roller.

Although various other modifications may be suggested by those versed in the art, it should be understood that we wish to embody within the scope of the patent granted hereon all such modifications as reasonably and properly come within the scope of our contribution to the art.

We claim:

1. In a method of manufacturing an optical fiber cable having a fiber core received in a sheath, said method including extruding a sheath around the core with the core being hauled-off loosely with a variable haul-off speed, guiding the optical cable with the sheath around at least one deflection roller following the extruder to form a defined one-sided seat for the core on the inside wall of the sheath in order to obtain a definite shrinkage of the sheath given a subsequent cooling, the improvement comprising varying the diameter of the deflection roller to obtain the desired length change between the sheath and the light waveguide core.

2. In a method according to claim 1, wherein the step of guiding the optical fiber cable from the extruder around at lest one deflection roller utilizes a plurality of deflection rollers, one after another for receiving the cable, said step of varying the diameter of the deflection roller varies at least the first deflection roller, which receives the cable from the extruder.

3. In a method according to claim 1, wherein the step of varying the diameter of the deflection roller includes sensing the haul-off speed and varying the diameter of the deflection roller dependent on the sensed haul-off speed.

4. In a method according to claim 3, wherein the step of varying the diameter of the deflection roller decreases the diameter of the deflection roller with a sensed increase in the haul-off speed.

5. In a method according to claim 1, which includes sensing the diameter of the optical fiber cable and the step of varying the diameter of the deflection roller varies the diameter dependent on the sensed diameter of the optical fiber cable.

6. In a method according to claim 5, wherein the step of varying the diameter of the deflection roller enlarges the diameter of the deflection roller with a second increase in the diameter of the optical fiber cable.

7. In a method according to claim 1, wherein the step of passing the optical cable over at least one deflection roller passes it over a plurality of deflection rollers and the step of varying the diameter of at least one deflection roller varies the diameter of more than one deflection roller.

8. In a method according to claim 1, wherein the step of guiding the cable over a deflection roller loops the cable through a looping angle at least 180° on the variable deflection roller.

9. In a method according to claim 1, which includes rotating the deflection roller with a defined movement to obtain a strain relief on the optical cable.

10. In a method according to claim 1, wherein the step of extruding includes introducing a gel-like compound with the light waveguide core as the sheath is extruded.

11. In a method according to claim 1, wherein the step of cooling the optical fiber cable includes passing the cable through a water bath.

12. In a method according to claim 1, wherein during the step of passing the cable around the deflection roller, includes maintaining the temperature of the optical fiber cable constant.

13. In a method according to claim 12, wherein the step of maintaining the temperature of the optical fiber cable constant maintains the temperature in a temperature range of 20°-120° C.

14. In a method according to claim 1, wherein the step of passing the cable from the extruder to a deflection roller passes the extruded cable directly to the deflection roller following the extruder.

15. In a method according to claim 1, which includes cooling the extruded sheath between extruding the sheath onto the fiber core and before guiding the cable to the deflection roller.

16. In a method according to claim 1, which includes sensing the haul-off speed of the fiber core, sensing the diameter of the optical fiber cable, and sensing the haul-off speed of the optical cable, evaluating the diameter and two speeds, and adjusting the diameter of the deflection roller in response to the two sensed speeds and diameter.

* * * * *